No. 698,186. Patented Apr. 22, 1902.
J. W. DWIGGINS & L. SWANK.
WIRE FENCE MACHINE.
(Application filed Oct. 24, 1901.)
(No Model.) 9 Sheets—Sheet 1.
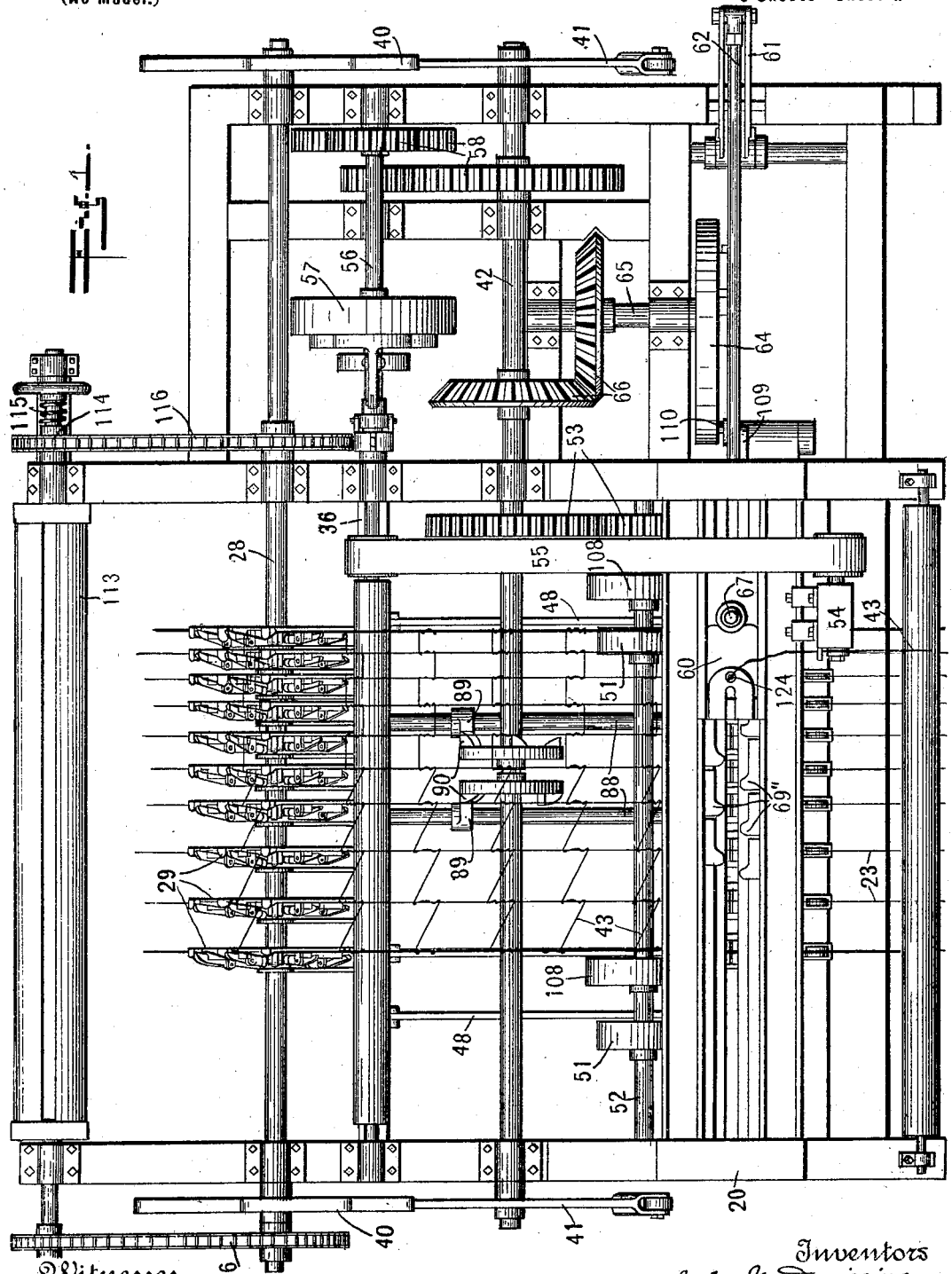
Witnesses
Frank A. Fahl
Bertha M. Ballard
Inventors
John W. Dwiggins
Lafe Swank
By
Arthur M. Hood
Attorney

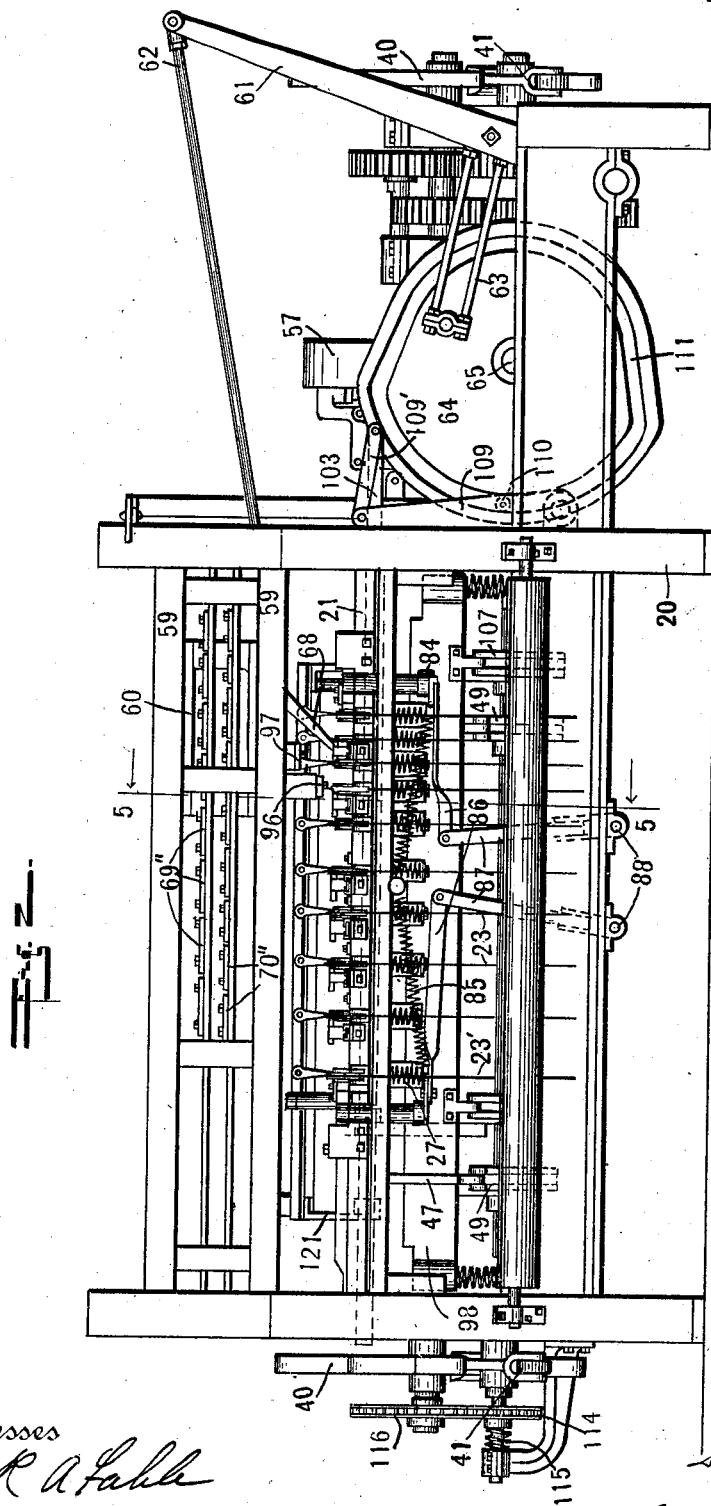

No. 698,186. Patented Apr. 22, 1902.
J. W. DWIGGINS & L. SWANK.
WIRE FENCE MACHINE.
(Application filed Oct. 24, 1901.)
(No Model.) 9 Sheets—Sheet 3.
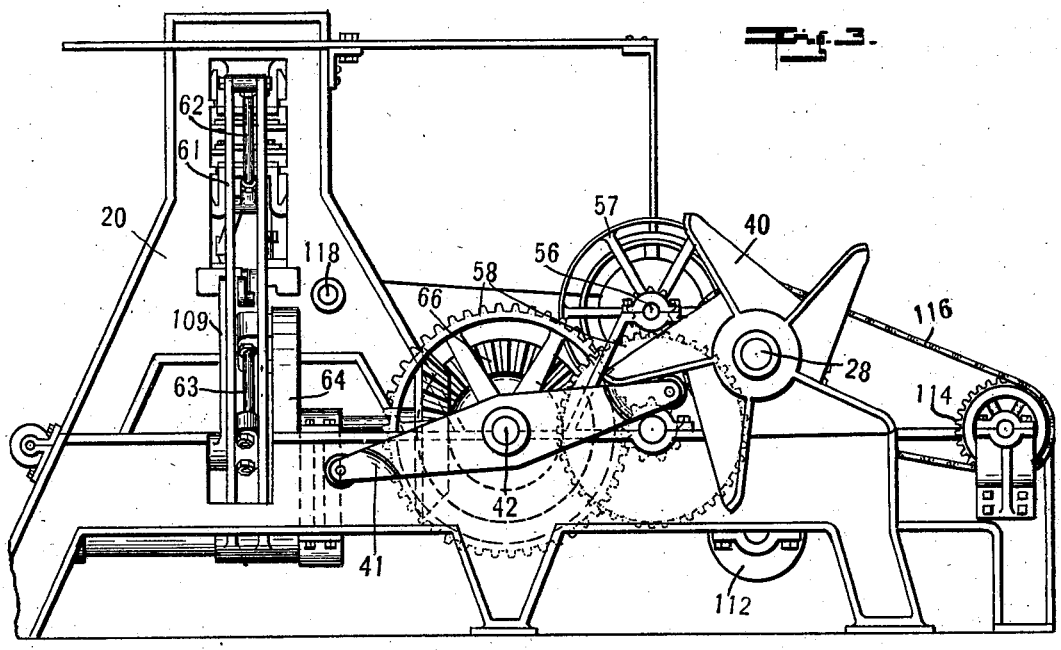
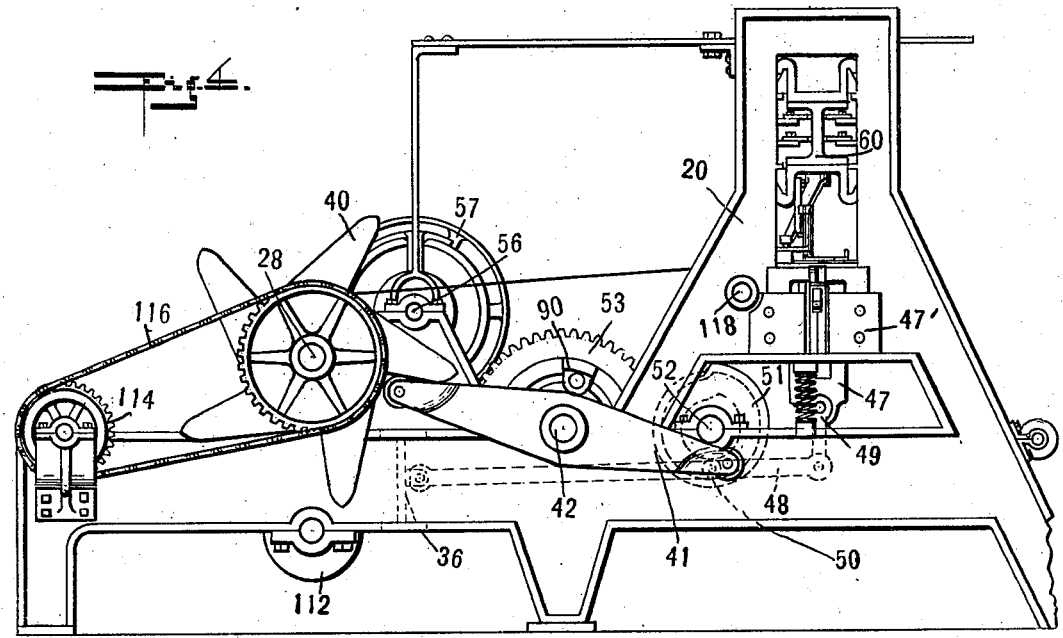
Witnesses
Frank A. Fahle
Bertha M. Ballard
Inventors
John W. Dwiggins
Lafe Swank
By Arthur M. Hood
Attorney No. 698,186. Patented Apr. 22, 1902.
J. W. DWIGGINS & L. SWANK.
WIRE FENCE MACHINE.
(Application filed Oct. 24, 1901.)
(No Model.) 9 Sheets—Sheet 4.
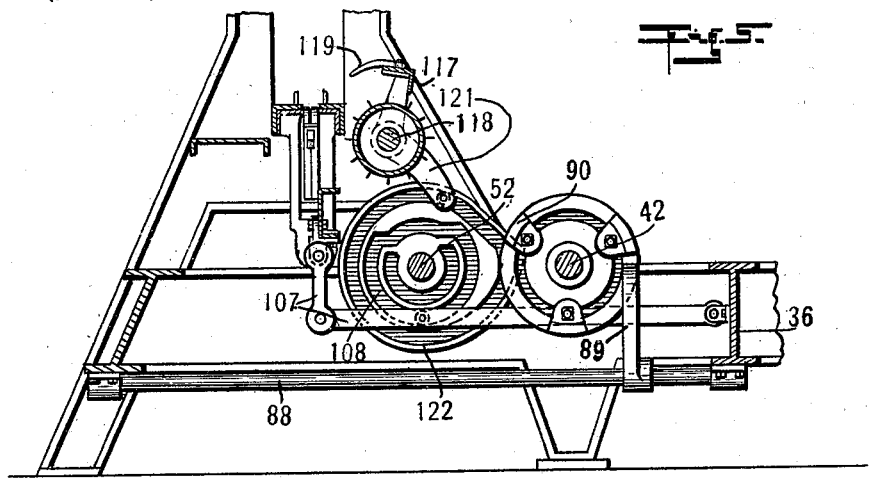
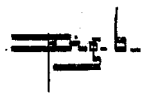
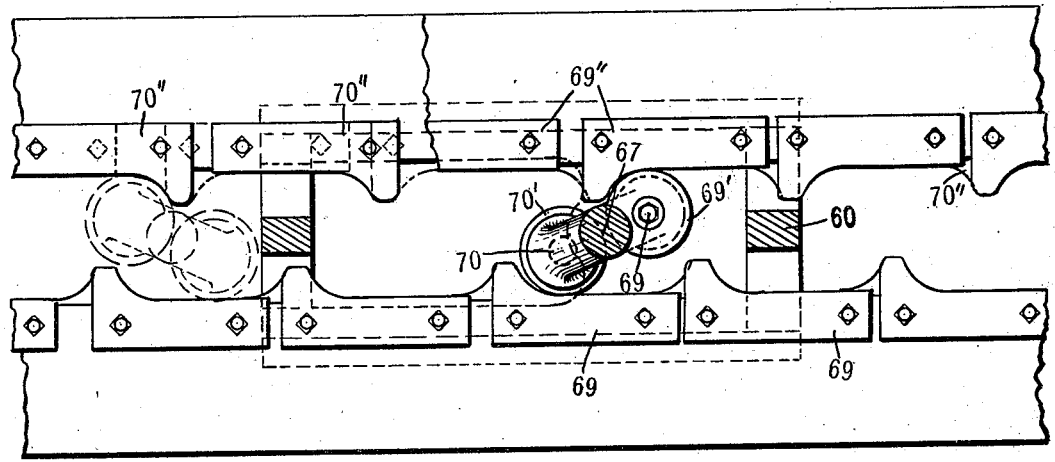
Witnesses
Inventors
Attorney No. 698,186. Patented Apr. 22, 1902.
J. W. DWIGGINS & L. SWANK.
WIRE FENCE MACHINE.
(Application filed Oct. 24, 1901.)
(No Model.) 9 Sheets—Sheet 5.
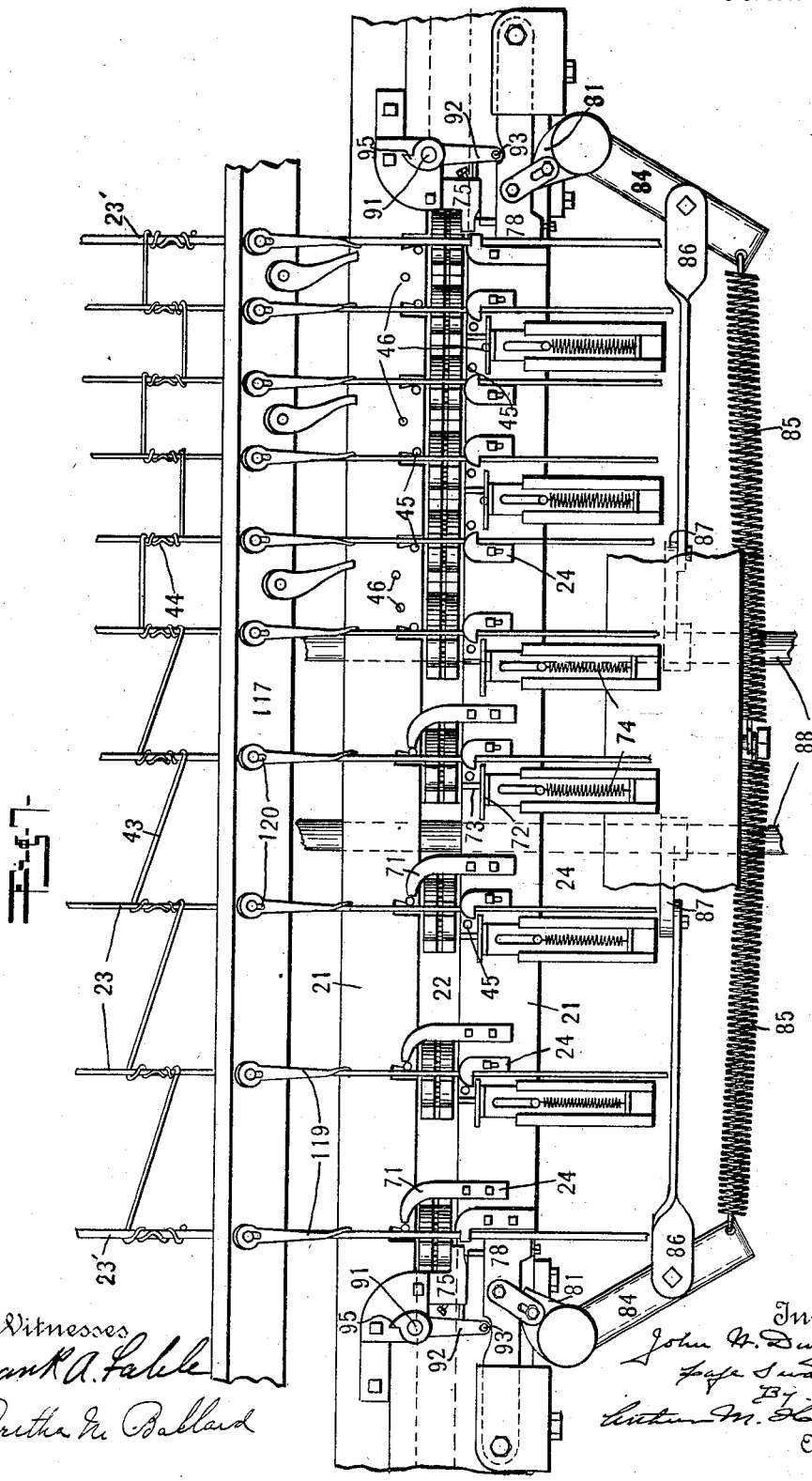

No. 698,186. Patented Apr. 22, 1902.
J. W. DWIGGINS & L. SWANK.
WIRE FENCE MACHINE.
(Application filed Oct. 24, 1901.)
(No Model.) 9 Sheets—Sheet 6.
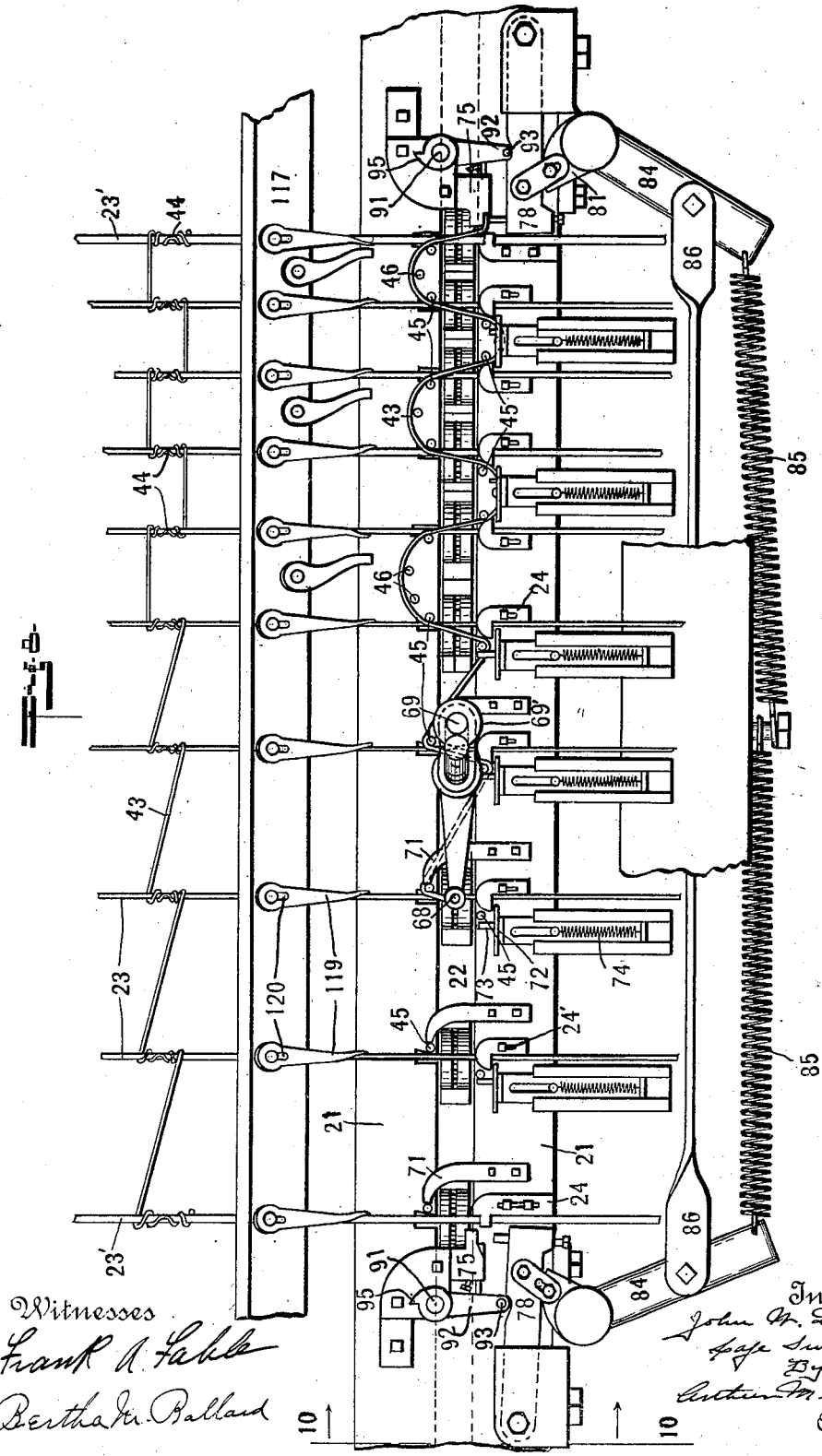

No. 698,186. Patented Apr. 22, 1902.
J. W. DWIGGINS & L. SWANK.
WIRE FENCE MACHINE.
(Application filed Oct. 24, 1901.)
(No Model.) 9 Sheets—Sheet 7.
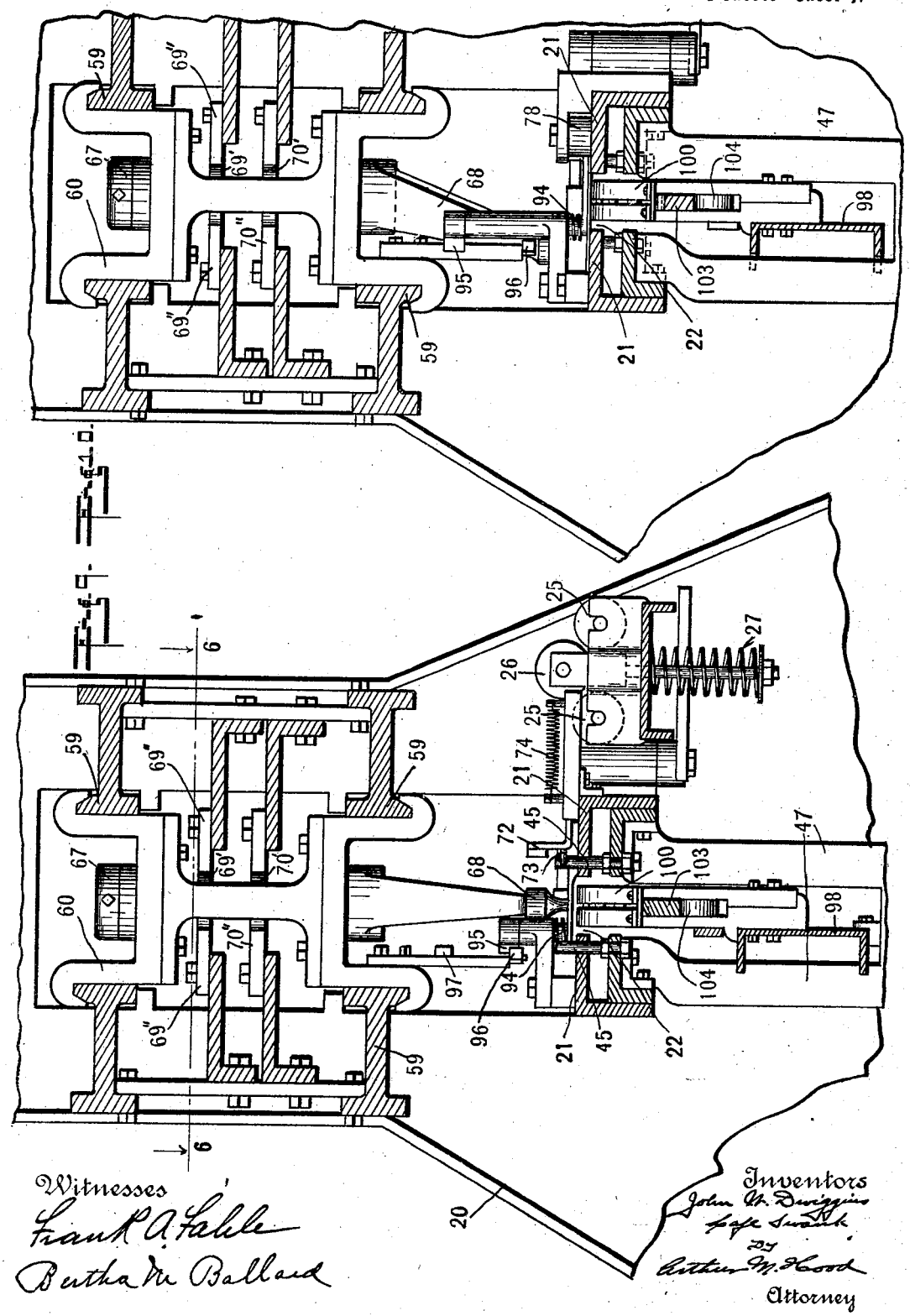
Witnesses
Frank P. Fakle
Bertha M. Ballard
Inventors
John W. Dwiggins
Lafe Swank
by
Arthur M. Hood
Attorney No. 698,186. Patented Apr. 22, 1902.
J. W. DWIGGINS & L. SWANK.
WIRE FENCE MACHINE.
(Application filed Oct. 24, 1901.)
(No Model.) 9 Sheets—Sheet 8.
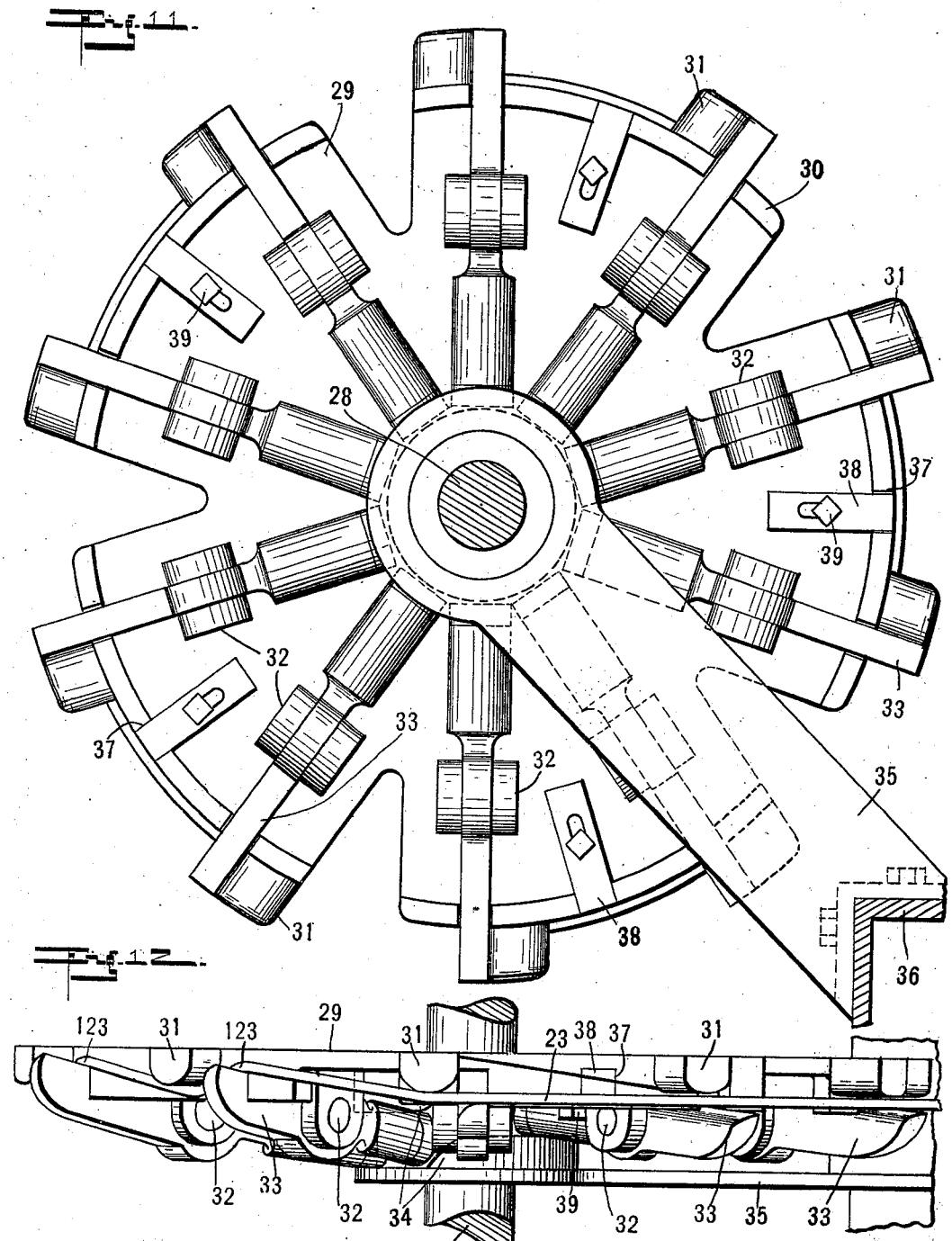
Witnesses
Inventors
Attorney No. 698,186. Patented Apr. 22, 1902.
J. W. DWIGGINS & L. SWANK.
WIRE FENCE MACHINE.
(Application filed Oct. 24, 1901.)
(No Model.) 9 Sheets—Sheet 9.
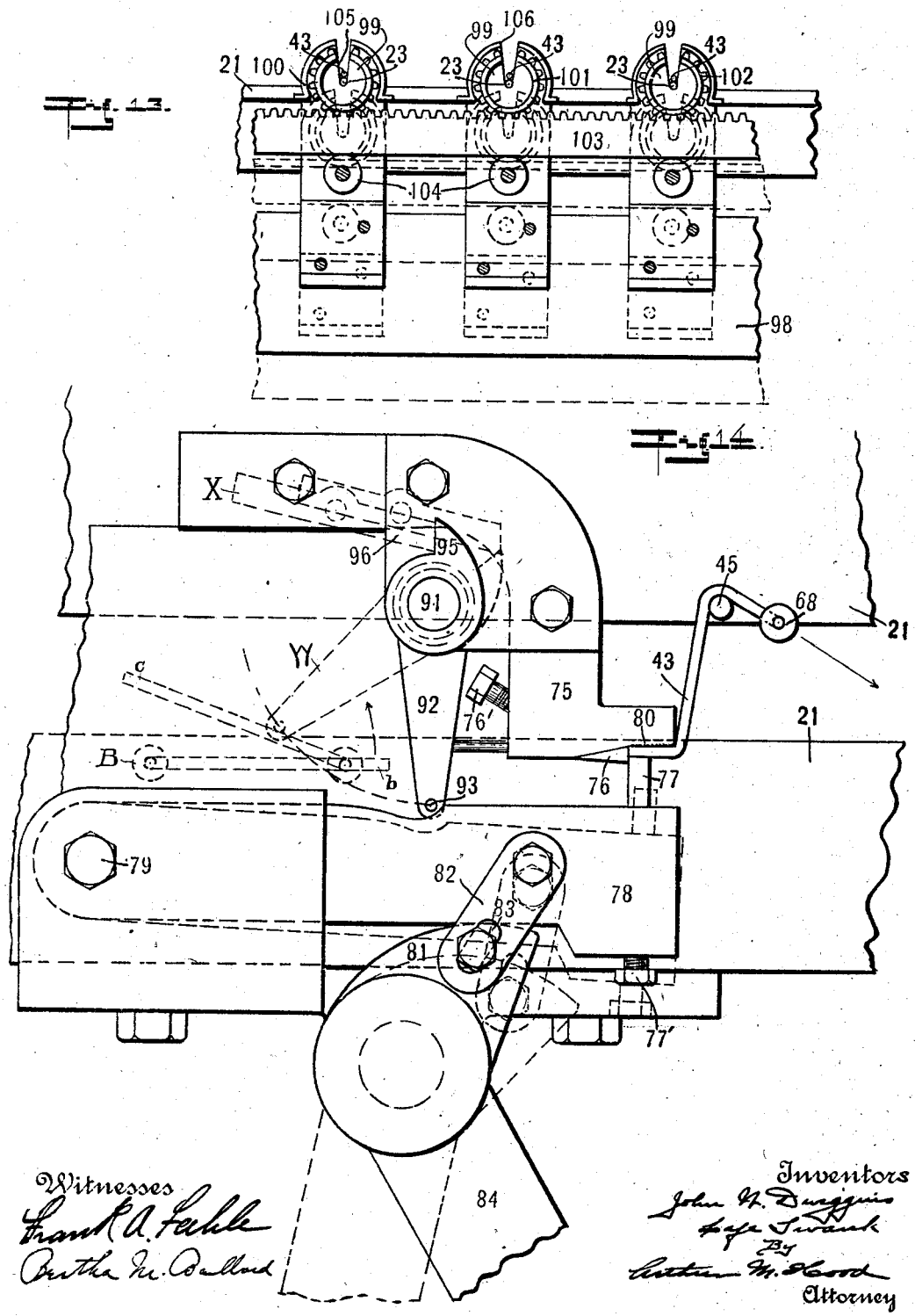

UNITED STATES PATENT OFFICE.

JOHN W. DWIGGINS AND LAFE SWANK, OF ANDERSON, INDIANA, ASSIGNORS TO THE DWIGGINS WIRE FENCE COMPANY, OF ANDERSON, INDIANA, A CORPORATION OF INDIANA.

WIRE-FENCE MACHINE.

SPECIFICATION forming part of Letters Patent No. 698,186, dated April 22, 1902.

Application filed October 24, 1901. Serial No. 79,842. (No model.)

*To all whom it may concern:*

Be it known that we, JOHN W. DWIGGINS and LAFE SWANK, citizens of the United States, residing at Anderson, in the county of Madison and State of Indiana, have invented a new and useful Wire-Fence Machine, of which the following is a specification.

Our invention relates to an improvement in wire-fence machines for the production of wire fencing composed of a series of substantially endless running-wires and a series of short stay-wires running transversely of the running-wires and attached thereto. In the production of a fence of this character great difficulty has heretofore been experienced from the fact that it has been practically impossible to feed exactly the same lengths of all of the running-wires through the machine during any given time, so that heretofore fences of this class have been very difficult to set up without sagging portions. In fences of this character also provision must be made for expansion and contraction of the running-wires, and the cross or stay wires must be thoroughly secured to the running-wires.

The object of our invention, therefore, is to produce a machine into which any desired number of running-wires may be fed parallel to each other and accurately drawn therethrough in equal lengths independent of the relative sizes of the wires, to provide means for automatically distributing stay-wire at predetermined points on the running-wires, to cut said stay-wire into proper lengths, to attach said wires to the running-wires accurately and securely by means which will not weaken or break either the running-wires or the stay-wire, and to provide such improvements in detail of construction as will automatically, cheaply, and accurately produce the fencing.

The accompanying drawings illustrate our invention.

Figure 1 is a plan. Fig. 2 is a front elevation. Fig. 3 is an elevation of the right-hand side of the machine. Fig. 4 is an elevation of the left-hand side of the machine. Fig. 5 is a vertical section on line 5 5 of Fig. 2. Fig. 6 is a horizontal section on line 6 6 of Fig. 9. Fig. 7 is a plan, on a larger scale, of the stay-wire-receiving table and adjacent parts, the several parts being in their positions shortly prior to the distribution of a section of stay-wire. Fig. 8 is a plan of the parts shown in Fig. 7 with the stay-wire partially distributed. Fig. 9 is a transverse section, on a larger scale, through the stay-wire-receiving table. Fig. 10 is a similar section on line 10 10 of Fig. 8. Fig. 11 is a side elevation of one head of the feeding-drum. Fig. 12 is a plan thereof. Fig. 13 is a detail of a portion of the twisting mechanism. Fig. 14 is a plan, on an enlarged scale, of one of the stay-wire shears and clamping-jaws with adjacent parts.

In the drawings, 20 indicates a suitable supporting-frame, which supports a pair of separated plates 21 21, which form a stay-wire-receiving table having a central opening or channel 22. The running-wires 23 and 23' are brought from suitable storage-rolls (not shown) and each passed through a guide 24, which guides are adjustably secured to the front plate 21 by a slotted connection 24'. In order to straighten and control the running-wires, each of said wires is passed through a tension device, which consists of a pair of rollers 25 and a third roller 26, mounted above and between the two rollers 25 and normally urged downward by a spring 27, the stay-wire being passed over the two rollers 25 and beneath the roller 26 and from thence each through its guide 24.

Mounted toward the rear of the machine parallel with the plate 21 is a feed-shaft 28, which carries a series of heads 29, which are of peculiar construction and which operate to positively draw the running-wires simultaneously and equally across the stay-wire-receiving table 21 21. The heads 29 are substantially identical and each consists of a circular plate, the periphery 30 of which is adapted to have a stay-wire wound thereon. Projecting from the periphery 30 at desired distances from each other is a series of lugs 31, and pivoted at 32 adjacent each lug 31 is a lever 33, the upper or outer end of which is adapted to coöperate with the adjacent lug 31 somewhat after the manner of a shear. The levers 33 are automatically swung on their pivots 32 by means of a stationary cam 34, which surrounds the shaft 28 and is held by a bracket 35, attached to a cross-beam 36 of the frame. The periphery 30 of each head 29 is notched at various points between the levers 33, as at 37, and mounted in each of these is a finger 38, which is adjustably held by a bolt 39, the arrangement being such that by projecting the fingers more or less from the periphery 30 the effective diameter thereof may be changed, so that the length of running-wire which would be wrapped upon the head by reason of its advancement through any predetermined arc may be regulated, so that all of the heads of a series will draw exactly the same lengths of running-wires across the stay-wire-receiving table even though some of the running-wires, such as the top and bottom wires 23', be larger than others. Shaft 28 is provided at each end with a star-wheel 40, the arms of which are adapted to be engaged by a pair of arms 41, carried by a main drive-shaft 42, which is parallel to the shaft 28.

In the present machine each star-wheel 40 is provided with five arms, so that the shaft 28 is advanced two-fifths of a revolution for each revolution of the drive-shaft 42.

The stay-wire 43 is attached to the running-wire by a peculiar twist, short sections of the stay-wire being laid substantially parallel to the running-wires, as shown in Fig. 8, and each of these short sections being grasped at approximately its middle and wrapped about the running-wire, as shown at 44 in Figs. 7 and 8. Those portions of the stay-wire which pass from one running-wire to another may lie at right angles to the running-wires or may pass diagonally from one running-wire to another, and in the drawings we have shown the stay-wire attached at different portions of its length in both ways.

In order to distribute the stay-wire properly with relation to the running-wires, we project through the plates 21 a series of pins 45, which pins are arranged in pairs on opposite sides of the slot or channel 22 and in pairs upon opposite sides of each running-wire. Where it is desired that the stay-wire shall run directly from one stay-wire to another, additional pins 46 are provided between pins 45, said pins being so set as to insure a proper amount of slack in the stay-wire, as clearly shown in Fig. 8. All of the pins 45 and 46 are carried by the upper ends of a yoke 47, suitable guide 47' being provided for said yoke. The pins 45 and 46 may be projected above and intermittently withdrawn beneath the surface of the stay-wire table 21 21 by means of a pair of levers 48, each connected by a link 49 to the yoke 47. Each lever 48 is suitably pivoted upon the frame and is provided with a roller 50, engaged by a cam 51, carried by a shaft 52, parallel with the drive-shaft 42 and properly geared thereto by gears 53, the arrangement being such that yoke 47 will be reciprocated once for each step of advancement of the shaft 28. The stay-wire is carried by a storage-roll (not shown) and is positively fed to the machine by a feeder 54, which is driven by a belt 55 from a counter-shaft 56, having a clutch-pulley 57, the counter-shaft 56 being geared to the main drive-shaft 42 by a train of gears 58.

Arranged above the table 21 21 and parallel thereto are guides 59, between and upon which is arranged a sliding needle-carriage 60, which is reciprocated along the guides above and parallel with the stay-wire table 21 21 by means of a lever 61, pitmen 62 and 63, and disk 64. Disk 64 is carried by a shaft 65, arranged at right angles with shaft 42 and geared thereto by suitable gears 66, the arrangement being such that carriage 60 is given a complete reciprocation for each revolution of the shaft 42.

Pivoted in the needle-carriage 60 upon a vertical shaft 67 is a needle 68. The shaft 67 is provided with a pair of oppositely-arranged cranks 69 and 70, upon which are mounted rollers 69' and 70', respectively. Arranged to coöperate with the roller 69' upon opposite sides of the carriage 60 is a series of cams 69", and arranged to coöperate with the roller 70' is a series of cams 70", the arrangement being such that as the carriage 60 is reciprocated that roller which is the hindmost or the "trailer" will be shifted from side to side by its cams, so as to swing the needle 68 about its axis as the carriage 60 moves along its guides, thus serving to distribute the stay-wire around the pins 45 and 46 in the manner clearly shown in Fig. 8. Under some circumstances, especially where the reach from one running-wire to another is considerable, as in the left-hand side of Fig. 8, there is a tendency for the stay-wire after it has been distributed to buckle away from the pins 45, and in order to prevent this we provide adjacent some of said pins a finger 71, beneath which the stay-wire will be drawn as it passes around the pins.

Adjacent each pin 45 on the front plate 21 we provide a different means for preventing the stay-wire from slipping off of said pins. This consists of a sliding guard 72, having a projecting finger 73, which projects toward the adjacent pin 45 a short distance above the plate 21. The guard is normally forced into the position shown in full lines in Figs. 8 and 9 by means of a spring 74; but the guard 72 lies in position to be engaged by the end of the needle 68 as said needle swings toward it, so as to be forced backward against the action of spring 74 to allow the insertion of the stay-wire, the guard immediately springing back to its position with its pin 73 over the stay-wire as soon as the needle has passed.

In order to cut the stay-wire the proper length and also in order to hold its ends during the process of twisting, we provide a clamping-shear (shown in Fig. 14) at each end of the stay-wire table 21 21. This clamping-shear consists of a stationary jaw 75, provided with a cutter 76, which is adapted to coöperate with a cutter 77, carried by the free end of a swinging jaw 78, pivoted at 79 to the frame. The said cutters are preferably adjustable by means of set-screws 76' and 77', respectively. Immediately adjacent the cutter 76 and in position to coöperate with the end of the cutter 77 is a stationary clamping-surface 80, which in practice is preferably roughened. Pivoted adjacent jaw 78 is a cam 81, which is adapted to engage said jaw and force the same toward the stationary jaw. The jaw 78 is withdrawn into the position shown in dotted lines in Fig. 14 by means of a link 82, pivoted upon the jaw and having a slotted connection 83 with the cam. Cam 81 is swung by means of a lever 84, to which is attached one end of a spring 85. Attached to each lever 84 is one end of a link 86, the opposite end being attached to an arm 87, carried by one of a pair of shafts 88, which shafts extend toward the back of the machine. Each of these shafts is provided with an arm 89, adapted to be engaged by a cam 90, carried by shaft 42.

Arranged upon a vertical shaft 91 is a trip-lever 92, provided at its end with a vertical pin 93, the said pin lying in front of the line of travel of the needle at that point and being held in the position indicated by full lines in Fig. 14 by means of a spring 94. (See Fig. 9.) Shaft 91 is provided with a projecting tooth 95. The tooth 95, belonging to the trip-lever at the left-hand end of the machine in Fig. 8, is adapted to be engaged in one direction only—i. e., upon the movement of the needle-carrier to the right—by a spring-pawl 96, carried by the needle-carriage. The tooth 95 of the trip-lever 92 at the right-hand end of the machine is adapted to be engaged in the opposite direction only by a spring-pawl 97.

Mounted immediately beneath the channel 22 and between the arms of the yoke 47 parallel with the channel is a bar 98, to which is secured a series of twisters, each of which is composed of a twisting-gear 99, revolubly supported in a housing 100. Each gear is provided on each face with an annulus 101, which journals in a corresponding groove in the housing, and each of said gears is also provided upon its periphery with a series of teeth 102, the teeth of all the gears meshing with a rack-bar 103, which may be reciprocated through the housings and is supported upon suitable rollers 104. Each gear is provided with a radial slot 105, which extends from its center to the periphery, and may be brought into register with a similar slot 106, formed in the housing parallel with the running-wires 23 or 23'. Connected to the bar 98 are levers 107, which are engaged by cams 108, carried by the shaft 52, the said cams operating normally to hold the twisting mechanism below the stay-wire table 21 21, but intermittently to project said twisters upward into the position shown in full lines in Fig. 13. Rack-bar 103 is intermittently reciprocated by means of a lever 109, which is connected to the end of the rack-bar by a link 109'. Lever 109 is provided with a roller 110, (see dotted lines, Fig. 2,) which lies within a cam-slot 111, formed in disk 64, the said cam-slot operating to give the rack-bar a half-reciprocation for each half-reciprocation of the needle-carriage.

The completed fencing is led from the heads 29 around an idler 112 and from thence to a storage-roll 113, rotatably mounted in the frame parallel with shaft 28. Rotatably mounted upon the shaft of roll 113 is a sprocket-wheel 114, which is held in yielding driving connection with said roll by a spring 115, the arrangement being such that when the sprocket 114 is driven by chain 116 from the shaft 28 the movement of the roll 113 will be only sufficient to take up the slack of the finished fencing between said roll and the idler 112.

For the purpose of regulating the length which the twisted portions 44 of the stay-wire occupy on the running-wires we provide a bar 117, pivoted upon a shaft 118. Secured to bar 117 is a series of fingers 119, which are adjustable by a slotted connection 120. Fingers 119 are adapted to be intermittently projected close to the table 21 21, adjacent some of the pins 45 and in opposition to guides 24, by an arm 121, the end of which lies in a cam-slot 122, formed in cam 108. (See Fig. 5.)

The operation is as follows: The cams 34 are so set that those levers 33 which lie between the axial line of shaft 28 and the stay-wire table lie with their free ends away from their adjacent lugs 31, so that a running-wire may be passed between the levers and adjacent lugs. Each lever 33 as it nears the point A, Fig. 11, however, is swung into proximity with its adjacent lug 31 in such manner as to form a kink 123 in the running-wire, and thus clamp said running-wire securely to the head. In practice it is customary to make the top and bottom running-wires of the fence somewhat heavier than the other wires, and in order to compensate for this difference the fingers 38 of the two end heads are retracted, so as to make said heads slightly smaller in diameter than the other heads. In preparing the machine for operation the running-wires 23 and 23' are each passed between their proper tension-rollers 25 and 26, from thence through the adjacent guide 24, so as to run between two pins 45, and from thence to the proper head 29, and the shaft 28 is then rotated enough to cause each wire to be firmly gripped between one or more of levers 33 and adjacent lugs 31. Guides 24 and fingers 119 are then adjusted so as to be the desired distance apart when fingers 119 are projected close to table 21 21. With the running-wires in this position and the needle-carriage to the extreme right in Fig. 2 a stay-wire 43 is threaded through the positive feed 54 and from thence through the eye 124 in the carriage 60, from which it passes through the eye of the needle 68, the end thereof being trailed to the right—i. e., to the rear of the direction of first motion of the carriage 60. The machine is then put in motion and the carriage 60 forced to the opposite end of its guides, (the left of Fig. 2.) Immediately the trailing end of the wire 43 passes between the cutters 76 and 77 of the right-hand shear (see Fig. 8) and the movable jaw of said shear is suddenly clamped upon said end by the action of cam 90, arm 89, shaft 88, arm 87, link 86, lever 84, and cam 81. This action cuts the surplus end from the stay-wire and clamps the newly-formed end between the surface 80 and the cutter 77. As the carriage 60 is forced along its guides the roller 69' is trailed against the coöperating cams 69" and oscillated therebetween, so as to oscillate the needle-eye 68 and distribute the stay-wire around the pins 45 and 46 in the manner illustrated in Fig. 8. After passing the last pin 45 (the left of Fig. 8) the last cam 69" brings the needle-eye 68 into a position where the stay-wire will pass the end of the stationary jaw 75 and pass between the cutters 76 and 77. Immediately the jaw 78 of the left-hand shear is thrown so as to cut the stay-wire and clamp the end between the cutter 77 and the surface 80, as shown in Fig. 14, the needle-eye 68 continuing approximately to the position shown in dotted lines at B in said Fig. 14. Immediately cams 108 throw bar 98 upward, so as to project the twisting mechanisms above the plane of the table 21 21, each twisting-gear 99 having its slot 105 in position to receive the adjacent running-wire and stay-wire, the running-wire lying at the center of the gear, as clearly shown in Fig. 13. At the same time fingers 119 are thrown down, so as to lie adjacent their pins 45 and establish the distance between the fingers and the opposite guides 24, so as to determine the amount of space the twisted portions 44 are to occupy on the running-wires. Cam-slot 111 has then reached a position to act upon roller 110 to cause a half-reciprocation of the rack-bar 103. At this moment cams 51 cause, through yoke 47, a retraction of the pins 45 and 46, and when the rack-bar is reciprocated the twisting-gears catch the middles of those portions 44 of the stay-wire which lie substantially parallel with the running-wires, so as to twist said portion about the running-wire and securely attach the stay-wire to each running-wire. Cams 90 cause a withdrawal of shear-jaws 78, so as to release the stay-wire immediately after the twisting-gears begin to twist the stay-wire. Cams 108 then cause the withdrawal of the twisting mechanisms, cams 51 reproject pins 45 and 46 above the table 21 21 and arms 41 come into engagement with the star-wheels 40 and rotate shaft 28, so as to advance all of the running-wires through equal lengths and draw said running-wires to a position where another stay-wire may be attached. At this time the needle 68 has remained substantially at the position B in Fig. 14, since the wrist-pin 63' is substantially on a dead-center so far as pitman 63 is concerned. As the needle starts to return to its initial position the projecting end of the new stay-wire projects to the right, (see b, Fig. 14,) whereas in order to be properly operated upon by the shear and clamp it should project in the opposite direction in order that it may be trailed through between the cutters 76 and 77. In order to shift the end of the stay-wire, therefore, we have provided the trip-lever 92 and coöperating parts. When the carriage 60 has passed to the left, the pawl 96 has sprung past the tooth 95 and lies in the position X, with its end back of and in position to operate against said tooth. As the carriage moves to the right pawl 96 engages the tooth 95 and swings trip-lever 92 into the position W, the pin 93 thereof engaging the end of the stay-wire and swinging the same in the direction indicated by the arrow in Fig. 14, so that as the needle continues to move to the right it will pass between the pin 93 and the jaw 78, thus throwing the stay-wire around through the position c into alinement with the original position, but projecting in the opposite direction, so that it will trail through between the jaws of the shears and be operated on in the manner already described. As the carriage 60 returns to its initial position wheel 69' is idle and the wheel 70' has become the trailer, and by reason of the cams 70" the needle is again reciprocated as it travels to the right, so as to distribute the stay-wire around pins 45 and 46. When the carriage has finished the distribution of the new stay-wire, the shear at the right hand again cuts and clamps the wire, the twisting-gears are again projected into twisting position, the pins 45 and 46 are withdrawn, the twisting-gears rotated, and the other mechanism operated in the manner already set forth. As the carriage starts upon its second reciprocation the end of the new stay-wire is turned so as to properly "trail" by reason of engagement of the pawl 97 with the tooth 95 of the right-hand trip-lever 92.

The action of this machine in applying the stay-wires, in feeding the running-wires through the machine, and in the disposal of the finished product is entirely automatic and the only labor required is the occasional attention of an operator to properly splice the running-wires and stay-wire as additional supplies are needed.

We claim as our invention—

1. In a wire-fence machine, the combination of means for feeding a series of running-wires therethrough, means for distributing a stay-wire transversely of the series of running-wires with single portions of the stay-wire adjacent and substantially parallel with the running-wires, and means for attaching the said portions of the stay-wire to the running-wires.

2. In a wire-fence machine, the combination of means for feeding a series of running-wires therethrough, means for distributing a stay-wire transversely of the series of running-wires with single portions of the stay-wire adjacent and substantially parallel with the running-wires, and means for twisting said parallel portions of the stay-wire about the adjacent running-wire.

3. In a wire-fence machine, the combination of means for intermittently feeding a series of running-wires therethrough, means for distributing a stay-wire transversely of the series of running-wires with single portions of the stay-wire adjacent and substantially parallel with the running-wires, and means for attaching said portions of the stay-wire to the running-wires.

4. In a wire-fence machine, the combination of means for intermittently feeding a series of running-wires therethrough, means for distributing a stay-wire transversely of the series of running-wires with single portions of the stay-wire adjacent and substantially parallel with the running-wires, and means for twisting said substantially parallel portions of the stay-wire each around the adjacent running-wire.

5. In a wire-fence machine, the combination with means for feeding a series of running-wires therethrough, of means for arranging a stay-wire transversely of the running-wires, the stay-wire having single portions substantially parallel with and adjacent the running-wires, and means for twisting said substantially parallel portions of the stay-wire about the running-wires.

6. In a wire-fence machine, the combination with means for feeding a series of running-wires therethrough, of means for arranging a stay-wire transversely of the running-wires, the stay-wire having single portions substantially parallel with and adjacent the running-wires, and means for attaching said substantially parallel portions of the stay-wire to the running-wires.

7. In a wire-fence machine, the combination with means for feeding a series of running-wires therethrough, of means for distributing a substantially endless stay-wire transversely of the running-wires with single portions of the stay-wire adjacent and substantially parallel with the running-wires, means for cutting the said wire to the desired length, means for clamping the ends of the stay-wire so formed, and means for twisting the substantially parallel portions of the stay-wire around the adjacent running-wires.

8. In a wire-fence machine, the combination with means for feeding a series of running-wires therethrough, of means for distributing a substantially endless stay-wire transversely of the running-wires with single portions of the stay-wire adjacent and substantially parallel with the running-wires, means for cutting the said wire to the desired length, means for clamping the ends of the stay-wire so formed, and means for securing the substantially parallel portions of the stay-wire to the running-wires.

9. In a wire-fence machine, the combination with means for feeding a series of wires therethrough, of a needle-carriage, means for reciprocating said carriage transversely of the running-wires, a needle carried by said carriage and adapted to carry a stay-wire, means for reciprocating said needle transversely of the line of movement of the carriage during such movement whereby a substantially endless stay-wire may be distributed by said needle transversely of the running-wires with portions thereof adjacent and substantially parallel with the running-wires, means for cutting the distributed portion of the stay-wire to the desired length, means for clamping the ends of the severed portion of the stay-wire, and means for twisting the substantially parallel portions of the stay-wire about the adjacent running-wires.

10. In a wire-fence machine, the combination of a stay-wire-receiving table, means for feeding a series of running-wires across said table, a series of pins arranged adjacent the running-wires and projecting above the table, means for distributing a stay-wire around the said pins and transversely of the running-wires whereby portions of the stay-wire will lie adjacent and substantially parallel with the running-wires, means for engaging and twisting said substantially parallel portions of the stay-wire about the running-wires, and means for withdrawing the pins from the stay-wire.

11. In a wire-fence machine, the combination with means for feeding a series of running-wires therethrough, of a needle-carriage, means for reciprocating said carriage transversely across the series of running-wires, a swinging needle journaled in said carriage so as to swing in a plane substantially parallel with the series of running-wires and adapted to receive a stay-wire, and means for swinging said needle during the movement of the carriage, whereby a stay-wire may be distributed in a zigzag line transversely of the running-wires.

12. In a wire-fence machine, the combination with means for feeding a series of running-wires therethrough, of a needle-carriage, means for reciprocating said carriage transversely across the series of running-wires, a swinging needle journaled in said carriage so as to swing in a plane substantially parallel with the series of running-wires and adapted to receive a stay-wire, a pair of oppositely-arranged cranks carried by the needle-shaft, and two groups of cams each group of cams being arranged to engage one only of the cranks whereby each crank and its set of cams will operate to reciprocate the needle during the travel of the carriage in one direction.

13. In a wire-fence machine, the combination with means for feeding a series of running-wires therethrough, a needle-carriage, means for reciprocating said carriage transversely across the series of running-wires, a swinging needle journaled in said carriage so as to swing in a plane substantially parallel with the running-wires and adapted to receive a stay-wire, a pair of oppositely-arranged cranks carried by the needle-shaft in the line of the carriage, and two groups of cams each adapted to engage and throw one of the cranks, the arrangement of cams being such that only the trailing crank will operate to oscillate the needle during either direction of travel of the carriage.

14. In a wire-fence machine, the combination with means for feeding a series of running-wires therethrough, of means for laying a stay-wire adjacent the running-wires, a series of twisting-gears, means for normally withholding said twisting-gears out of the line of movement of the running-wires, means for projecting said twisting-gears into engagement with the running-wires and stay-wires, and means for rotating said gears after their projection.

15. In a wire-fence machine, the combination with means for feeding a series of running-wires therethrough, of a stay-wire-distributing needle, and means for reciprocating said needle both transversely and longitudinally with relation to the running-wires.

16. In a wire-fence machine, the combination with means for feeding a series of running-wires therethrough, of a stay-wire-distributing needle, and means for moving said needle adjacent the running-wires both transversely and longitudinally thereof.

17. In a wire-fence machine, the combination of a stay-wire-distributing needle, means for reciprocating the same across the running-wires, means for cutting the stay-wire, means for clamping the ends of said stay-wire, and means for reversing the direction of the fresh end of the stay-wire supply before it reënters the clamping means.

18. In a wire-fence machine, the combination of a stay-wire-distributing needle, means for reciprocating the needle across the running-wires, a combined cutting and clamping shear adapted to cut and clamp the stay-wire, and means for reversing the direction of the fresh end of the stay-wire supply before it reënters the cutting and clamping means.

19. In a wire-fence machine, the combination of a stay-wire-distributing needle, means for reciprocating said needle across the running-wires, means for cutting the stay-wire, means for clamping the ends thereof, a trip-lever 92, a finger 93 carried thereby, a pawl carried by the needle and adapted to deflect the trip-lever during the movement of said needle in one direction, and means for returning the trip-lever to its initial position, the arrangement being such that the finger 93 will be brought into engagement with the fresh end of the stay-wire supply and reverse its direction for a reversal of motion of the needle.

20. In a wire-fence machine, means for positively clamping each running-wire and feeding uniform lengths thereof therethrough, whereby all the running-wires of a given length of completed fencing will be of uniform length.

21. In a wire-fence machine, a feeding-drum for the running-wires, consisting in part of means for positively clamping each running-wire at successive points and moving the same through a uniform distance.

22. In a wire-fence machine, a feeding-drum consisting of a series of heads each adapted to receive one of the running-wires, means carried by each head for clamping and kinking its running-wire, and means for simultaneously advancing all of said heads through a uniform peripheral distance.

23. In a wire-fence machine, a feed-head adapted to receive a running-wire, a series of lugs projecting from the periphery thereof, a series of levers arranged to coöperate with said lugs, means for rotating said head, and means for swinging each lever toward and from its lug, whereby a running-wire may be automatically clamped and kinked between the lugs and levers; uniformly fed through the machine; and released from the feeder, substantially as shown and described.

24. In a wire-fence machine, a feeding-drum for the running-wires, consisting of a series of heads, one for each running-wire, means for adjusting the effective diameter of each of said heads, means carried by each of said heads for positively clamping its running-wire, and means for rotating the entire drum, whereby uniform lengths of all running-wires will be fed through the machine independent of the relative size of said wires.

25. In a wire-fence machine, a feeding-drum for the running-wires, consisting of a series of connected heads, one for each running-wire, a series of lugs projecting from the periphery of each head, a series of levers carried by each head and arranged one adjacent each lug, means for swinging each lever into and away from juxtaposition with its lug so as to clamp the running-wire and kink it transversely, a series of fingers projecting from the periphery of each drum, means for adjusting said fingers toward and from the periphery so as to vary the effective diameter of each head, and means for rotating the head, substantially as and for the purpose set forth.

26. In a wire-fence machine, the combination with wire feeding and guiding mechanism, of twisting mechanism consisting of a plurality of slotted twisting-gears, a rack meshing with all of said gears, means for projecting said gears intermittently into the twisting position, and means for giving the rack a half-reciprocation for each projection of the twisting-gears into twisting position.

27. In a wire-fence machine, the combination with wire feeding and guiding mechanism, of twisting mechanism consisting of a plurality of slotted twisting-gears, means for projecting said gears intermittently into twisting position, and means for rotating said gears.

28. In a wire-fence machine, the combination with wire feeding and guiding mechanism, of twisting mechanism consisting of a plurality of slotted twisting-gears, means for projecting said gears intermittently into twisting position, and means for rotating said gears in opposite directions for alternate projections of said gears into twisting position.

29. In a wire-fence machine, the combination of a stay-wire-receiving table, means for feeding a series of running-wires across said table, a series of stay-wire pins projected above said table, a stay-wire-distributing needle, means for moving said needle both transversely and longitudinally of the running-wires so as to distribute the stay-wire around the stay-wire pins and transversely of the running-wires with portions adjacent and substantially parallel with the running-wires, a series of sliding guards mounted adjacent some of the stay-wire pins and each carrying a pin adapted to lie normally adjacent a stay-wire pin and above the position to be occupied by the distributed stay-wire, the arrangement being such that the needle operates to retract the guard-pin from its normal position at the time of the distribution of the stay-wire around the adjacent stay-wire pin.

30. In a wire-fence machine, the combination with means for feeding a plurality of running-wires therethrough, of means for attaching thereto a transverse stay-wire having portions adjacent and substantially parallel with the running-wires, such means consisting of a plurality of twisting-gears, means for causing said gears to engage the running-wires and stay-wire so as to twist the substantially parallel portions of the stay-wire about the running-wires, and guards arranged to engage the stay-wire adjacent the running-wires and regulate the length of the twist.

31. In a wire-fence machine, the combination with means for feeding a plurality of running-wires therethrough, a plurality of twisting-gears, means for causing said gears to engage the running-wires and those portions of a transverse stay-wire which lie adjacent and substantially parallel to the running-wires so as to twist such portions around the running-wires, a guide for each running-wire, a plurality of fingers, and means for moving said fingers into opposition to the guides so as to engage the stay-wire and regulate the length of twist upon the running-wires.

32. In a wire-fence machine, the combination with a stay-wire-receiving table, of means for feeding a plurality of running-wires across said table, a plurality of stay-wire pins projecting above said table, adjacent the running-wires, a plurality of guides one for each running-wire, a plurality of fingers, means for bringing said fingers adjacent the running-wires each in opposition to one of the guides, twisting mechanism adapted to engage portions of a stay-wire and wrap them upon the running-wires, and means for withdrawing the stay-wire pins, substantially as described.

33. In a wire-fence machine, the combination with a stay-wire-receiving table, of means for feeding a plurality of running-wires across said table, a plurality of stay-wire pins projecting above said table adjacent the running-wires, a plurality of guides one for each running-wire, each adjustable longitudinally of its wire, a plurality of adjustable fingers, means for bringing said fingers adjacent the running-wires each in opposition to one of the guides, twisting mechanism adapted to engage portions of a stay-wire and wrap them upon the running-wires, and means for withdrawing the stay-wire pins, substantially as described.

34. In a wire-fence machine, the combination of a stay-wire-distributing needle, means for reciprocating the needle across the running-wires, means for cutting the stay-wire, means for clamping the ends of the stay-wire, and means for engaging the fresh end of the stay-wire supply and reversing the direction thereof before it reënters the clamping means.

35. In a wire-fence machine, the combination with a stay-wire-applying means, of means for positively clamping each running-wire after the stay-wire has been applied, and means for moving said clamping means whereby all of the running-wires of a given length of completed fencing will be of uniform length.

36. In a wire-fence machine, the combination with a stay-wire-applying means, of means for positively engaging and kinking each running-wire after the stay-wires have been applied, and means for moving said clamping and kinking means to feed the running-wires through the machine.

37. In a wire-fence machine, the combination with means for applying stay-wires, means for positively clamping the running-wires after the stay-wires have been applied, and means for intermittently moving said clamping means whereby uniform lengths of running-wires are intermittently drawn through the machine.

JOHN W. DWIGGINS.
LAFE SWANK.

Witnesses:
KATHRYN VAN METRE,
EVA SWANK.